(12) United States Patent
Lucast et al.

(10) Patent No.: US 6,903,151 B2
(45) Date of Patent: Jun. 7, 2005

(54) WET-STICK ADHESIVES, ARTICLES, AND METHODS

(75) Inventors: Donald H. Lucast, North St. Paul, MN (US); Dong-Wei Zhu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 42 days.

(21) Appl. No.: 10/359,761

(22) Filed: Feb. 6, 2003

(65) Prior Publication Data

US 2003/0171454 A1 Sep. 11, 2003

Related U.S. Application Data

(62) Division of application No. 09/367,508, filed as application No. PCT/US99/13866 on Jun. 18, 1999, now Pat. No. 6,518,343.

(51) Int. Cl.$^7$ .................. C09J 133/10; C09J 171/02; C08L 33/10; C08L 71/02
(52) U.S. Cl. .................. 524/277; 524/276; 525/92 A; 525/404; 525/411; 525/412
(58) Field of Search .................. 524/276–277; 525/92 A, 404, 411–412

(56) References Cited

U.S. PATENT DOCUMENTS

| | | | |
|---|---|---|---|
| RE24,906 E | 12/1960 | Ulrich | 206/59 |
| 3,234,062 A | 2/1966 | Morris | 156/104 |
| 3,449,184 A | 6/1969 | Balk | 156/105 |
| 3,681,179 A | 8/1972 | Theissen | 161/4 |
| 3,772,262 A | 11/1973 | Clementi | 260/94.7 |
| 3,786,116 A | 1/1974 | Milkovich et al. | 525/276 |
| 3,842,059 A | 10/1974 | Milkovich et al. | 525/592 |
| 3,867,222 A | 2/1975 | Plant et al. | 156/107 |
| 4,035,549 A | 7/1977 | Kennar | 428/409 |
| 4,181,752 A | 1/1980 | Martens et al. | 427/54.1 |
| 4,188,436 A | 2/1980 | Ellis et al. | 428/198 |
| 4,234,533 A | 11/1980 | Langlands | 264/261 |
| 4,299,639 A | 11/1981 | Bayer | 156/104 |

(Continued)

FOREIGN PATENT DOCUMENTS

| | | |
|---|---|---|
| DE | 3926897 | 3/1991 |
| DE | 4406978 | 3/1994 |
| DE | 19522792 | 6/1995 |
| DE | 4432368 | 3/1996 |
| DE | 196 28 999 | 3/1998 |
| EP | 0 099 087 | 1/1984 |
| EP | 0 056 719 B1 | 5/1987 |
| EP | 91800 | 9/1992 |
| EP | 0 525 403 A1 | 2/1993 |
| EP | 353972 | 1/1994 |
| EP | 0 593 231 | 2/1994 |
| EP | 0 593 231 * | 4/1994 |
| EP | 670338 | 9/1995 |
| EP | 0 670 338 * | 9/1995 |
| EP | 0 701 822 * | 3/1996 |
| EP | 0 710 545 A1 | 5/1996 |
| EP | 853 092 | 7/1998 |
| GB | 2 155 856 | 10/1985 |
| JP | 51-89540 | 8/1976 |
| JP | 8295850 | 4/1995 |
| JP | 96073826 | 3/1996 |
| WO | WO92/04418 | 3/1992 |
| WO | WO93/10177 | 5/1993 |
| WO | WO 93/10177 * | 5/1993 |
| WO | WO95/27014 | 10/1995 |
| WO | WO 95/27014 * | 10/1995 |
| WO | WO97/07161 | 2/1997 |
| WO | WO98/03208 | 1/1998 |
| WO | WO98/29516 | 7/1998 |
| WO | WO99/14415 | 3/1999 |

OTHER PUBLICATIONS

J. Yamashita, et al., *Polymer Journal*, 14, 255–260 (1982).
K. Ito et al., *Macromolecules*, 13, 216–221 (1980).
Textbook of Polymer Science, Second. Ed., publ. Wiley–Interscience, pp. 84–85 (1971).
Masters, K., *Spray Drying: An Introduction to Principles, Operational Practice, and Application*, 2nd Edition, Wiley, NY 1976, pp. 74–93.
Satas, D., *The Handbook of Pressure Sensitive Adhesive Technology*, 2nd Edition, Van Nostrand Reinhold, NY, 1989, pp. 172–173.
ASTM Designation: D 3654M–88 (Reapproved 1993), Standard Test Method for Holding Power of Pressure–Sensitive Tapes (Metric).
Fox, T. G., Bulletin of the American Physical Society (ser. 2), 12.3, J5 (1956).
Kirk–Othmer Encyclopedia of Chemical Technology, 4th Edition, John Wiley & Sons, NY, vol. 6, 1993, pp. 635–636.
Nichols, R. T. and R. M. Sowers, "Laminated Materials, Glass," *Kirk–Othmer Encyclopedia of Chemical Technology*, 4th Ed., pp. 1059–1074, 1995.
Sung Gun Chu, Chapter 8, Handbook of Pressure Sensitive Adhesive Technology, Second Edition, Donatas Satas, Editor, pp. 158–203, 1989.
Patent Abstracts of Japan, vol. 1995, No. 1, Feb. 28, 1995 & JP 06285978, Oct. 11, 1994 (abstract).
"BASF Performance Chemicals Pluronic® and Tetronic® Surfactants," BASF Product Information Brochure, Title page, Table of Contents, and pp. 1–5 (1996).

*Primary Examiner*—Peter Szekely
(74) *Attorney, Agent, or Firm*—Nancy M. Lambert

(57) ABSTRACT

A wet-stick pressure-sensitive adhesive is provided wherein the pressure-sensitive adhesive comprises: at least one copolymerized monoethylenically unsaturated (meth)acrylic acid ester monomer, wherein the (meth)acrylic acid ester monomer, when homopolymerized, has a Tg of less than about 10° C.; at least one copolymerized hydrophilic acidic comonomer; and at least one nonreactive copolymer comprising at least two copolymerized alkylene oxides, at least one of which is hydrophobic and at least one of which is hydrophilic.

25 Claims, No Drawings

U.S. PATENT DOCUMENTS

| | | | |
|---|---|---|---|
| 4,303,485 A | 12/1981 | Levens | 204/159.24 |
| 4,329,384 A | 5/1982 | Vesley | 428/40 |
| 4,330,590 A | 5/1982 | Vesley | 428/336 |
| 4,341,576 A | 7/1982 | Lewis | 156/106 |
| 4,358,329 A | 11/1982 | Masuda | 156/106 |
| 4,359,547 A | 11/1982 | Agarwal et al. | 524/504 |
| 4,362,587 A | 12/1982 | Baudin et al. | 156/87 |
| 4,379,201 A | 4/1983 | Heilmann | 428/345 |
| 4,385,951 A | 5/1983 | Pressau | 428/105 |
| 4,386,991 A | 6/1983 | Shiomi et al. | 156/308.6 |
| 4,431,471 A | 2/1984 | Mertens et al. | 156/103 |
| 4,452,840 A | 6/1984 | Sato et al. | 428/156 |
| 4,465,729 A | 8/1984 | Cancio et al. | 428/167 |
| 4,543,283 A | 9/1985 | Curtze et al. | 428/38 |
| 4,554,324 A | 11/1985 | Husman | 525/301 |
| 4,569,960 A | 2/1986 | Blake | 524/145 |
| 4,595,001 A | 6/1986 | Potter et al. | 128/156 |
| 4,598,004 A | 7/1986 | Heinecke | 428/40 |
| 4,599,274 A | 7/1986 | Ando et al. | 428/442 |
| 4,619,979 A | 10/1986 | Kotnour et al. | 526/88 |
| 4,671,913 A | 6/1987 | Gen et al. | 264/171 |
| 4,737,559 A | 4/1988 | Kellen | 526/291 |
| 4,843,134 A | 6/1989 | Kotnour et al. | 526/318.4 |
| 4,871,812 A | 10/1989 | Lucast et al. | 525/186 |
| 4,925,725 A | 5/1990 | Endo et al. | 428/156 |
| 4,952,618 A | 8/1990 | Olsen | 524/17 |
| 5,049,608 A | 9/1991 | Medina | 524/375 |
| 5,091,258 A | 2/1992 | Moran | 428/437 |
| 5,100,963 A | 3/1992 | Lin | 525/221 |
| 5,125,995 A | 6/1992 | D'Haese et al. | 156/155 |
| 5,147,485 A | 9/1992 | Gajewski et al. | 156/104 |
| 5,178,933 A | 1/1993 | Yoshida et al. | 428/207 |
| 5,180,756 A | 1/1993 | Rehmer et al. | 522/35 |
| 5,190,992 A | 3/1993 | Kato et al. | 522/180 |
| 5,254,388 A | 10/1993 | Melby et al. | 428/120 |
| 5,268,049 A | 12/1993 | Marriott et al. | 156/99 |
| 5,362,801 A | 11/1994 | Amici et al. | 525/57 |
| 5,397,614 A | 3/1995 | Patnode et al. | 428/40 |
| 5,407,971 A | 4/1995 | Everaerts et al. | 522/35 |
| 5,425,977 A | 6/1995 | Hopfe | 428/141 |
| 5,429,590 A | 7/1995 | Saito et al. | 602/48 |
| 5,436,283 A | 7/1995 | Okada et al. | 523/120 |
| 5,441,998 A | 8/1995 | Teeters et al. | 524/270 |
| 5,445,890 A | 8/1995 | Bayha et al. | 428/431 |
| 5,455,103 A | 10/1995 | Hoagland et al. | 428/167 |
| 5,461,103 A | 10/1995 | Bafford et al. | 524/460 |
| 5,487,412 A | 1/1996 | Matthews et al. | 138/149 |
| 5,506,279 A | 4/1996 | Babu | 522/34 |
| 5,536,347 A | 7/1996 | Moran | 156/103 |
| 5,547,736 A | 8/1996 | Simon et al. | 428/143 |
| 5,595,818 A | 1/1997 | Hopfe et al. | 428/327 |
| 5,613,942 A | 3/1997 | Lucast et al. | 602/52 |
| 5,620,779 A | 4/1997 | Levy et al. | 428/167 |
| 5,637,646 A | 6/1997 | Ellis | 525/309 |
| 5,716,701 A | 2/1998 | Skoglund et al. | 428/355 |
| 5,733,570 A | 3/1998 | Chen et al. | 424/445 |
| 5,741,542 A | 4/1998 | Williams et al. | 427/208.4 |
| 5,750,134 A | 5/1998 | Scholz et al. | 424/434 |
| 5,753,768 A | 5/1998 | Ellis | 525/309 |
| 5,785,985 A | 7/1998 | Czech et al. | 424/448 |
| 5,804,610 A | 9/1998 | Hamer et al. | 522/182 |
| 5,876,855 A | 3/1999 | Wong et al. | 428/355 BL |
| 5,939,479 A * | 8/1999 | Reaves et al. | 524/276 |
| 5,969,069 A | 10/1999 | Su | 526/318.44 |
| 5,976,690 A | 11/1999 | Williams et al. | 428/345 |

* cited by examiner

WET-STICK ADHESIVES, ARTICLES, AND METHODS

CROSS REFERENCE TO RELATED APPLICATIONS

This is a division of application Ser. No. 09/367,508, filed Aug. 13, 1999 now U.S. Pat. No. 6,518,343; which was a national stage filing under 35 U.S.C. 371 of PCT/US99/13866 filed Jun. 18, 1999, which International Application was published by the International Bureau in English on Dec. 28, 2000.

FIELD OF THE INVENTION

This invention pertains to a pressure-sensitive adhesive and more particularly to a pressure-sensitive adhesive containing a poly(alkylene oxide) copolymer that provides bond formation useful for adhesion to wet surfaces, such as skin or like delicate surfaces.

BACKGROUND OF INVENTION

Pressure-sensitive adhesive (PSA) articles are used in a wide variety of applications where there is a need to adhere to skin, for example, medical tapes, wound or surgical dressings, athletic tapes, surgical drapes, or tapes or tabs used in adhering medical devices such as sensors, electrodes, ostomy appliances, or the like. A concern with many of these adhesive articles is the need to balance the objective of providing sufficiently high levels of adhesion to wet skin as well as to dry skin. Thus, pressure-sensitive adhesives that adhere to wet or moist surfaces, particularly skin, are referred to as "wet-stick" adhesives.

One approach in the art to providing pressure-sensitive adhesive articles for application to wet skin has been the use of pattern coated adhesives. A discontinuous adhesive coating on a backing allows the skin to breathe, at least in the areas of the backing not coated with adhesive. This approach is disclosed in U.S. Pat. No. 4,595,001 (Potter, et al.) and U.S. Pat. No. 5,613,942 (Lucast, et al.), as well as EP 353972 (Takemoto, et al.) and EP 91800 (Potter, et al.). These patent documents generally teach intermittent coating of adhesives onto different backings.

(Meth)acrylate pressure-sensitive adhesives are attractive materials for many applications. (Meth)acrylates are known for their optical clarity, oxidative resistance, and inherently tacky nature. Inherently tacky (meth)acrylate pressure-sensitive adhesives (i.e., materials that require no additives such as tackifying resins) are typically formulated predominately from acrylic acid ester monomers of nontertiary alcohols. Examples of such monomers include n-butyl acrylate, 2-ethylhexyl acrylate, isooctyl acrylate, isononyl acrylate, isodecyl acrylate and dodecyl acrylate. When these (meth)acrylate monomers are polymerized, the homopolymers have a glass transition temperature (Tg) of less than about 10° C. This low Tg is a necessary property in (meth)acrylate materials that exhibit tack at room temperature. Such (meth)acrylate polymers are hydrophobic in nature and, without modification, are generally unsuitable as wet-stick adhesives.

A means to increase the hydrophilic character of (meth) acrylate polymers is to copolymerize the (meth)acrylate monomers with hydrophilic acidic comonomers, such as acrylic acid, methacrylic acid, beta-carboxyethyl acrylate, itaconic acid, sulfoethyl acrylate, and the like. Addition of these hydrophilic acidic comonomers in minor amounts (e.g., about 1 weight percent to about 15 weight percent) can also enhance the internal or cohesive strength of the PSA. This increased polymer reinforcement, however, can diminish the tack of the hydrophilic acidic comonomer-containing (meth)acrylate copolymer.

At higher acidic comonomer levels, (meth)acrylate copolymers can dramatically lose their tack and become highly hydrophilic. When exposed to water, the moisture helps to transform these highly acidic, low tack compositions into tacky materials that are suitable as wet-stick adhesives used in many medical applications. When the water is allowed to evaporate, however, these adhesives lose their pressure-sensitive tack. Thus, although this provides suitable wet-stick adhesion in some applications, there is still a need for articles having good initial wet-stick adhesion in other applications, preferably, on the order of the same article's initial dry-stick adhesion.

SUMMARY OF INVENTION

Briefly, in one aspect of the present invention, a wet-stick pressure-sensitive adhesive is provided wherein the pressure-sensitive adhesive comprises:

(a) at least one copolymerized monoethylenically unsaturated (meth)acrylic acid ester monomer, wherein the (meth)acrylic acid ester monomer when homopolymerized has a Tg of less than about 10° C.;

(b) at least one copolymerized hydrophilic acidic monomer; and (c) at least one nonreactive poly(alkylene oxide) copolymer comprising at least two copolymerized alkylene oxides, at least one of which is hydrophilic (e.g., ethylene oxide) and at least one of which is hydrophobic (e.g., propylene oxide).

In another embodiment is an article that includes a backing and a wet-stick pressure-sensitive adhesive as described above. The adhesives of the present invention adhere to wet surfaces, preferably and advantageously, to wet skin. The glass transition temperature of the adhesive is preferably at least about 10° C. The glass transition temperatures of the homopolymers and adhesive are typically accurate to within ±5° C. and are measured by differential scanning calorimetry.

Yet another embodiment is a method of making a wet-stick pressure-sensitive adhesive. The method includes combining under conditions effective to cause polymerization: at least one monoethylenically unsaturated (meth)acrylic acid ester monomer, which when homopolymerized, has a Tg of less than about 10° C.; at least one hydrophilic acidic monomer; and at least one nonreactive poly(alkylene oxide) copolymer comprising at least two copolymerized alkylene oxides, at least one of which is hydrophilic and at least one of which is hydrophobic.

A method of using an adhesive article is also provided. The method involves: providing an adhesive article comprising a backing and a wet-stick pressure-sensitive adhesive layer disposed thereon, wherein the wet-stick pressure-sensitive adhesive comprises: at least one copolymerized monoethylenically unsaturated (meth)acrylic acid ester monomer, wherein the (meth)acrylic acid ester monomer when homopolymerized has a Tg of less than about 10° C.; at least one copolymerized hydrophilic acidic monomer; and at least one nonreactive poly(alkylene oxide) copolymer comprising at least two copolymerized alkylene oxides, at least one of which is hydrophilic and at least one of which is hydrophobic; and adhering the adhesive article to skin.

As used herein in this application:

"pressure-sensitive adhesive" or "PSA" refers to a viscoelastic material that displays aggressive tackiness and adheres well to a wide variety of substrates after applying only light pressure (e.g., finger pressure). An acceptable quantitative description of a pressure-sensitive adhesive is given by the Dahlquist criterion, which indicates that materials having a storage modulus (G') of less than about $4.0 \times 10^5$ Pascals (measured at room temperature) have pressure sensitive adhesive properties;

"wet-stick adhesive" refers to a material that exhibits pressure-sensitive adhesive properties when adhered to at least a wet surface, preferably, to both wet and dry surfaces, particularly skin;

"(meth)acrylate monomers" are acrylic acid esters or methacrylic acid esters of nontertiary alcohols, the alcohols preferably having about 4 to 14 carbon atoms;

"hydrophilic acidic monomers" are water soluble ethylenically unsaturated, free radically reactive monomers having carboxylic acid, sulfonic acid, or phosphonic acid functionality and are copolymerizable with the (meth)acrylate monomers;

"hydrophilic alkylene oxides" are monomers that are polymerizable to oligomers or homopolymers that are soluble in room-temperature (25° C.) water at 10% by weight;

"hydrophobic alkylene oxides" are monomers that are polymerizable to oligomers or homopolymers that are insoluble in room-temperature water at 10% by weight;

"copolymer" includes a polymer of any length (including oligomers) of two or more types of polymerizable monomers, and therefore includes terpolymers, tetrapolymers, etc., which can include random copolymers, block copolymers, or alternating copolymers; and "nonreactive" refers to components that do not contain free radically reactive ethylenically unsaturated groups that could co-react with the comonomers or functionalities or significantly inhibit the polymerization of these monomers.

DESCRIPTION OF PREFERRED EMBODIMENT(S)

Generally, the wet-stick pressure-sensitive adhesive of the present invention includes a copolymer that includes at least one copolymerized monoethylenically unsaturated (meth) acrylic acid ester monomer, wherein the (meth)acrylic acid ester monomer, when homopolymerized, has a Tg of less than about 10° C., and at least one copolymerized hydrophilic acidic monomer. Mixed with this copolymer is at least one nonreactive copolymer comprising at least two copolymerized alkylene oxide monomers, at least one of which is hydrophilic and at least one of which is hydrophobic. Preferably, the pressure-sensitive adhesive adheres to wet skin.

Nonreactive poly(alkylene oxide)s have been used in wet-stick pressure-sensitive adhesives in the past. For example, U.S. Pat. No. 5,733,570 (Chen et al.) teach the use of poly(ethylene oxide) (PEO) and poly(propylene oxide) (PPO) oligomers or polymers. However, PPO is hydrophobic and it is not suitable for the present application as is demonstrated in Comparative Example 2. PEO at low molecular weight (less than about 1000) migrates out of the adhesive formulations because of its low molecular weight and high water solubility. PEO polymers at high molecular weight (greater than about 1000, especially at the preferred range of about 3000–12000) are crystalline materials and will phase separate from the present adhesive compositions.

The ratio of each comonomer in the wet-stick adhesive composition can be chosen to optimize the performance. For example, higher levels of the acidic comonomer can increase the overall Tg and the stiffness of the wet-stick adhesive composition. However, the increased Tg (and modulus) may necessitate higher levels of the poly(alkylene oxide) copolymer. Dependant on the desired end use, higher or lower levels of poly(alkylene oxide) copolymer may be beneficial. For example, if high cohesive strength is desired, typically lower levels of poly(alkylene oxide) copolymer are used.

The present invention also provides articles that include a backing substrate having a continuous or discontinuous adhesive layer disposed thereon. Preferably, such articles have an initial wet skin adhesion of at least about 20 g/2.5 cm (0.8 Newtons/decimeter (N/dm)), and more preferably, at least about 40 g/2.5 cm (1.6 N/dm). Preferably, the initial dry skin adhesion is at least about 20 g/2.5 cm (0.8 N/dm), and more preferably, at least about 40 g/2.5 cm (1.6 N/dm). Preferably, the adhesive article (i.e., a substrate with a continuous or discontinuous layer of adhesive disposed thereon) has an initial wet skin adhesion that is at least about 65%, more preferably, at least about 75%, and most preferably, at least about 100%, of the initial dry skin adhesion. The comparison of wet to dry skin adhesion can be carried out using the test protocol described in the Examples Section. Herein, wet skin has visually observable water thereon.

Inherent viscosity (IV) is a measurement of molecular weight. A higher IV indicates a higher molecular weight. IV and therefore molecular weight can be adjusted by using chain transfer agents such as are known in the art. The preferable IV range for the present application is about 0.3 to about 1.2, and more preferably about 0.5 to about 1.0.

(Meth)acrylate Monomers

The wet-stick adhesives of the present invention contain at least one copolymerized monoethylenically unsaturated (meth)acrylic acid ester (i.e., an alkyl acrylate or alkyl methacrylate), wherein the alkyl group has at least about 4 carbon atoms (on average). Alternatively stated, these (meth)acrylate monomers are (meth)acrylic acid esters of nontertiary alkyl alcohols, the alkyl groups of which preferably include about 4 to about 14, more preferably about 4 to about 8, carbon atoms (on average). The alkyl group can optionally contain heteroatoms and can be linear or branched. When homopolymerized, these monomers yield inherently tacky polymers with glass transition temperatures which are typically below about 10° C. Preferred (meth) acrylate monomers have the following general Formula (I):

Formula (I)

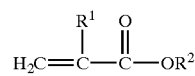

wherein $R^1$ is H or $CH_3$, the latter corresponding to where the (meth)acrylate monomer is a methacrylate monomer, and $R^2$ is broadly selected from linear or branched hydrocarbon groups and optionally includes one or more heteroatoms. The number of carbon atoms in the hydrocarbon group is preferably about 4 to about 14, and more preferably about 4 to about 8.

Examples of suitable (meth)acrylate monomers useful in the present invention include, but are not limited to, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methylbutyl acrylate, 4-methyl-2-pentyl acrylate, ethoxy ethoxyethyl acrylate, and the like. Various combinations of these monomers can be used if desired. Particularly preferred are n-butyl acrylate, 2-ethylhexyl acrylate, isooctyl acrylate, lauryl acrylate, and mixtures thereof.

Preferably, the copolymerizable mixture of the present invention includes, based upon the total weight of the copolymerizable monomers, at least about 30 weight percent (wt-%), more preferably, at least about 40 wt-%, and most preferably, at least about 50 wt-%, of the (meth)acrylate monomer. Preferably, the copolymerizable mixture of the present invention includes, based upon the total weight of the copolymerizable monomers, no greater than about 80 wt-%, more preferably, no greater than about 75 wt-%, and most preferably, no greater than about 70 wt-%, of the (meth)acrylate monomer.

Hydrophilic Acidic Monomers

Useful copolymerized hydrophilic acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include, but are not limited to, acrylic acid, methacrylic acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like. Various combinations of these monomers can be used if desired. Due to their availability and effectiveness in reinforcing (meth)acrylate pressure-sensitive adhesives, particularly preferred hydrophilic acidic monomers are the ethylenically unsaturated carboxylic acids, most preferably acrylic acid.

Preferably, the copolymerizable mixture of the present invention includes, based upon the total weight of the copolymerizable monomers, at least about 5 wt-%, more preferably, at least about 10 wt-%, and most preferably, at least about 15 wt-% of the hydrophilic acid (meth)acrylate monomer. Preferably, the copolymerizable mixture of the present invention includes, based upon the total weight of the copolymerizable monomers, no greater than about 35 wt-%, more preferably, no greater than about 30 wt-%, and most preferably, no greater than about 28 wt-%, of the hydrophilic acid monomer.

Optional Monomers

Minor amounts of monomers copolymerizable with the (meth)acrylate monomers and hydrophilic acidic monomers, such as (meth)acrylamides, vinyl esters, and N-vinyl lactams, can be used. Examples include, but are not limited to, N-alkylated (meth)acrylamides, such as, N-methyl acrylamide, N-ethyl acrylamide, N-methylol acrylamide, N,N-dimethyl acrylamide, N,N-dimethyl methacrylamide, N,N-diethyl acrylamide, N,N-diethyl methacrylamide, N-isopropyl acrylamide, t-butyl acrylarnide, N-octyl acrylamide, 4-(N,N-dimethylamido) butylacrylate; N-vinyl lactams, such as, N-vinyl pyrrolidone, N-vinyl caprolactam; and N-vinyl formamide. Various combinations of these monomers can be used if desired. Typically, no more than about 5 wt-% of the total weight of the copolymerizable monomers are used such that the performance of the adhesive is not impaired.

Nonreactive Poly(Alkylene Oxide) Copolymers

One or more poly(alkylene oxide) copolymers can be combined with the reactive monomers (e.g., (meth)acrylate monomers and hydrophilic acidic monomers) or with the copolymer formed from the reactive monomers. The poly(alkylene oxide) copolymers are selected for use in the wet-stick adhesive such that they improve the pressure-sensitive adhesive characteristics of the copolymerized monomers, are compatible with the copolymerized monomers, and are nonvolatile. Generally, any significant bleeding or migration of the poly(alkylene oxide) copolymer from the adhesive composition is not desirable and could result in loss of wet-stick adhesion properties.

As used herein, a compatible component is one that does not interfere with the polymerization of the monomers and does not phase separate from the wet-stick adhesive composition. By "phase separation" or "phase separate," it is meant that visible crystallization or liquid regions do not appear in the adhesive solution or bulk adhesive. Some migration of the poly(alkylene oxide) copolymer from or throughout the wet-stick adhesive composition can be tolerated, such as minor separation due to composition equilibrium or temperature influences, but the poly(alkylene oxide) copolymer does not migrate to the extent of phase separation between the copolymerized acrylate monomers and the poly(alkylene oxide) copolymer.

As used herein, a nonvolatile component remains present and stable under polymerization reaction conditions. Also, to maintain adhesion properties, the poly(alkylene oxide) copolymer remains present and does not significantly evaporate from the adhesive composition. "Nonvolatile component" refers to components that, when present in the wet-stick adhesive composition of this invention, generate less than about 3 weight percent VOC (volatile organic content). The VOC can be determined analogously to ASTM D 5403-93 by exposing the coated composition to 100° C.±5° C. in a forced draft oven for 1 hour. If less than about 3 weight percent of any one component is lost from the pressure-sensitive adhesive composition, then the component is considered "nonvolatile."

Additionally, the poly(alkylene oxide) copolymer is nonreactive to prevent reaction or interference with the polymerization of the copolymer formed from the (meth)acrylate monomers and hydrophilic acidic monomers. However, if the poly(alkylene oxide) copolymer is added during polymerization of the reactive monomers, there could be a small amount (typically, less than about 1 wt-%) that bonds to the pressure sensitive adhesive due to chain transfer. Because this is not a significant amount, the poly(alkylene oxide) copolymer is considered "nonreactive."

The poly(alkylene oxide) copolymers include at least two copolymerized alkylene oxide monomers, at least one of which is hydrophilic and at least one of which is hydrophobic. A preferred copolymer is formed from ethylene oxide and propylene oxide. They can be random, alternating, or block. Preferably, they are block copolymers that include hydrophobic and hydrophilic segments.

Hydrophilic poly(alkylene oxides) typically have higher melting points than hydrophobic poly(alkylene oxides). Thus, the amount of each used to prepare any poly(alkylene oxide) copolymer is balanced to provide the desired melting point of the copolymer. For preferred embodiments of the present invention, the melting point of the poly(alkylene oxide) copolymer is no greater than about 50° C. More preferably, the melting point of the copolymer is no greater than about 25° C. Such preferred low-melting embodiments are less likely to phase separate from the pressure-sensitive adhesive composition.

Particularly useful poly(alkylene oxide) copolymers have a weight average molecular weight of about 1000 to about 15,000, preferably of about 3000 to about 12,000.

Preferred poly(alkylene oxide) copolymers have appreciable water solubility, preferably, at least about 10 parts per 100 parts of water, exhibit surfactant characteristics preferably having an HLB (hydrophilic lipophilic balance) value of about 3 to about 15, and more preferably, about 5 to about 12. Useful poly(alkylene oxide) copolymers have ratios of hydrophilic monomers (e.g., ethylene oxide) to hydrophobic monomers (e.g., propylene oxide) of from about 90:10 to about 10:90, more preferably, from about 80:20 to about 30:70.

Monomers that may be used to make poly(alkylene oxide) copolymers include ethylene oxide and related glycols as a hydrophilic component and propylene oxide, butylene oxide, trimethylene oxide, tetramethylene oxide and the like and related glycols as a hydrophobic component. The poly(alkylene oxide) copolymers may be terminated with lower alkyl groups, amino groups, hydroxyl groups, carboxylic acid groups, aromatic groups, or other nonreactive groups.

Examples of useful poly(alkylene oxide) copolymers include, but are not limited to, those poly(alkylene oxide) copolymers available under the trade designations TETRONIC™ (tetrafunctional block copolymers derived from sequential addition of propylene oxide and ethylene oxide to ethylene diamine with hydrophilic endblocks) and TETRONIC™ R (tetrafunctional block copolymers derived from sequential addition of propylene oxide and ethylene oxide to ethylene diamine with hydrophobic endblocks) copolymers available from BASF, Mt. Olive, N.J.; PLURONIC™ (triblock copolymers with poly(ethylene oxide) end blocks and poly(propylene oxide) midblock) and PLURONIC™ R (triblock copolymers with poly(propylene oxide) endblocks and polyethylene oxide) midblock) copolymers available from BASF; UCON™ Fluids (random copolymers of ethylene oxide and propylene oxide) available from Union Carbide, Danbury, Conn.; and JEFFAMINE™ poly(alkylene oxide) copolymers available from Huntsman Chemical Corporation, Houston, Tex. Various combinations of poly(alkylene oxide) copolymers can be used in the wet-stick adhesives of the present invention.

Preferably, the poly(alkylene oxide) copolymer can be used in an amount of at least about 9 weight percent (wt-%), based on the total weight of the adhesive composition (e.g., the copolymerized (meth)acrylate/hydrophilic acidic comonomers and poly(alkylene oxide) copolymer). More preferably, the poly(alkylene oxide) copolymer is used in an amount of at least about 13 wt-%, and most preferably, at least about 20 wt-%. Preferably, the poly(alkylene oxide) copolymer can be used in an amount of no greater than about 30 wt-%. The amount of poly(alkylene oxide) copolymer required depends upon the type and ratios of the (meth)acrylate and hydrophilic acidic comonomers employed in the polymerizable mixture and the type and molecular weight of the poly(alkylene oxide) copolymer used in the adhesive composition.

Crosslinkers

In order to improve shear or cohesive strength, control elastic modulus and preadhesion tack, for example, of the adhesives of the present invention, the copolymers present in the adhesive can be crosslinked. Preferably, the crosslinking agent is one that is copolymerized with the reactive monomers. The crosslinking agent may produce chemical crosslinks (e.g., covalent bonds). Alternatively, it may produce physical crosslinks that result, for example, from the formation of reinforcing domains due to phase separation or acid base interactions. Suitable crosslinking agents are disclosed in U.S. Pat. No. 4,379,201 (Heilman), U.S. Pat. No. 4,737,559 (Kellen), U.S. Pat. No. 5,506,279 (Babu et al.), and U.S. Pat. No. 4,554,324 (Husman). Combinations of various crosslinking agents can be used to make the copolymers present in the adhesives of the present invention. It should be understood, however, that such crosslinking agents are optional.

Suitable crosslinking agents include thermal crosslinking agents such as a multifunctional aziridine, for example.

Other crosslinkers include 1,6-hexanedioldiacrylate and trimethylolpropane triacrylate, and substituted triazines, and the chromophore-substituted halo-s-triazines described in U.S. Pat. No. 4,329,384 (Vesley) and U.S. Pat. No. 4,330,590 (Vesley).

Another class of suitable agents are the copolymerizable monoethylenically unsaturated aromatic ketone monomers free of ortho-aromatic hydroxyl groups such as those disclosed in U.S. Pat. No. 4,737,559 (Kellen). Yet another class of suitable crosslinking agents are the multifunctional radiation-activatable crosslinking agents described in International Publication No. WO 97/07161 (assigned to 3M Company), and in U.S. Pat. No. 5,407,971 (Everaerts et al.). Also suitable are hydrogen-abstracting carbonyls such as anthraquinone, benzophenone, and derivatives thereof, as disclosed in U.S. Pat. No. 4,181,752 (Martens et al.).

Other suitable crosslinking agents include chemical crosslinkers that rely upon free radicals to carry out the crosslinking reaction. Reagents such as peroxides, for example, serve as a precursor of free radicals. When heated sufficiently, these precursors will generate free radicals that bring about a crosslinking reaction of the polymer chains.

Aside from thermal or photosensitive crosslinkers, crosslinking may also be achieved using high energy electromagnetic radiation such as gamma or e-beam radiation, for example.

A physical crosslinking agent may also be used. In one embodiment, the physical crosslinking agent is a high Tg macromer such as those that include vinyl functionality and are based upon polystyrene and polymethylmethacrylate. Such vinyl-terminated polymeric crosslinking monomers are sometimes referred to as macromolecular monomers (i.e., "macromers"). Such monomers are known and may be prepared by the methods disclosed in U.S. Pat. No. 3,786,116 (Milkovich et al.) and U.S. Pat. No. 3,842,059 (Milkovich et al.), as well as Y. Yamashita et al., *Polymer Journal*, 14, 255–260 (1982), and K. Ito et al., *Macromolecules*, 13, 216–221 (1980).

If used, the crosslinking agent is used in an effective amount, by which is meant an amount that is sufficient to cause crosslinking of the pressure-sensitive adhesive to provide adequate cohesive strength to produce the desired final adhesion properties to the substrate of interest. Preferably, if used, the crosslinking agent is used in an amount of about 0.1 part to about 10 parts, based on 100 parts of monomers. ps Other Additives Other additives can be included in the polymerizable mixture or added at the time of compounding or coating to change the properties of the adhesive. Such additives, or fillers, include pigments, glass or polymeric bubbles or beads (which may be expanded or unexpanded), fibers, reinforcing agents, hydrophobic or hydrophilic silica, toughening agents, fire retardants, antioxidants, finely ground polymeric particles such as polyester, nylon, and polypropylene, and stabilizers. The additives are added in amounts sufficient to obtain the desired end-use properties.

Polymerization Initiators

A free radical initiator is preferably added to aid in the copolymerization of (meth)acrylate and acidic comonomers. The type of initiator used depends on the polymerization process. Photoinitiators which are useful for polymerizing the polymerizable mixture of monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1, 1-propanedione-2-(O-ethoxycarbonyl)

oxime. An example of a commercially available photoinitiator is IRGACURE 651 (2,2-dimethoxy-1,2-diphenylethane-1-one, commercially available from Ciba-Geigy Corporation). Examples of suitable thermal initiators include AIBN (2,2'-azobis(isobutyronitrile), hydroperoxides, such as tert-butyl hydroperoxide, and peroxides, such as benzoyl peroxide, cyclohexane peroxide, and the VAZO 52, VAZO 64, VAZO 67, and VAZO 88 initiators, which are substituted azonitrile compounds, commercially available from Dupont Company. Generally, the initiator is present in an amount of about 0.005 part to about 1 part based on 100 parts of total monomer.

Polymerization Chain Transfer Agents

Optionally, the composition also includes a chain transfer agent to control the molecular weight of the polymerized compositions. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, 2-mercaptoethyl ether, and alcohols (e.g., isopropanol), and mixtures thereof. The amount of chain transfer agent that is useful depends upon the desired molecular weight and the type of chain transfer agent. The chain transfer agent is typically used in amounts from about 0.001 part to about 10 parts by weight per 100 parts of total monomer.

Methods of Making Adhesive Compositions

The wet-stick pressure-sensitive adhesives of the present invention can be prepared by a wide variety of conventional free radical polymerization methods as described in textbooks and open literature such as "Principles of Polymerization" by George Odian, published by McGraw-Hill Book Company. Specific polymerization methods used in this invention are discussed under "GENERAL PROCEDURES" in the Examples.

In one solution polymerization method, the alkyl (meth) acrylate monomers and acidic monomers, and poly(alkylene oxides), along with a suitable inert organic solvent, and free radically copolymerizable crosslinker, if used, are charged into a four-neck reaction vessel which is equipped with a stirrer, a thermometer, a condenser, an addition funnel, and a temperature controller. After this monomer and poly (alkylene oxide) copolymer mixture is charged into the reaction vessel, a concentrated thermal free radical initiator solution is added to the addition funnel. The whole reaction vessel and addition funnel and their contents are then purged with nitrogen to create an inert atmosphere. Once purged, the solution within the vessel is heated to decompose the added thermal initiator, and the mixture is stirred during the course of the reaction. A conversion of about 98 percent to about 99 percent is typically obtained in about 20 hours. If desired, solvent can be removed to yield a hot melt coatable adhesive. Suitable inert organic solvents, if required, may be any organic liquid which is inert to the reactants and product and will not otherwise adversely affect the reaction. Such solvents include ethyl acetate, acetone, methyl ethyl ketones, and mixtures thereof. The amount of solvent is generally about 30 percent by weight to about 80 percent by weight based on the total weight of the reactants (monomer, poly(alkylene oxide) crosslinker, initiator) and solvent.

Another polymerization method is the ultraviolet (UV) radiation initiated photopolymerization of the monomer mixture. This composition, along with suitable photoinitiator, crosslinker and poly(alkylene oxide) copolymer, is coated onto a flexible carrier web and polymerized in an inert, i.e., oxygen-free, atmosphere, such as a nitrogen atmosphere, for example. A sufficiently inert atmosphere can be achieved by covering a layer of the photoactive coating with a plastic film that is substantially transparent to ultraviolet radiation, and irradiating through that film in air using fluorescent-type ultraviolet lamps that generally give a total radiation dose of about 500 milliJoules/cm$^2$.

Solventless polymerization methods, such as exposure to ultraviolet (UV) radiation as described in U.S. Pat. No. 4,181,752 (Martens), the continuous free radical polymerization in an extruder described in U.S. Pat. No. 4,619,979 (Kotnour, et al.) and U.S. Pat. No. 4,843,134 (Kotnour, et al.); the essentially adiabatic polymerization methods using a batch reactor described in U.S. Pat. No. 5,637,646 (Ellis); and, the methods described for polymerizing packaged preadhesive compositions described in U.S. Pat. No. 5,804,610 (Hamer, et al.) may also be utilized to prepare the polymers. In using such methods, the package would include the reactive monomers and the nonreactive poly(alkylene oxide) copolymer.

The adhesive compositions of the present invention may be applied to a backing by a variety of coating methods, including brush, roll, spray, spread, wire, gravure, transfer roll, air knife, or doctor blade coating.

If the composition includes an organic solvent or water, it is then dried at a temperature (e.g., about 65° C. to about 120° C.) and a time (e.g., several minutes to about one hour) so as to provide an adhesive tape or dressing, for example. The thickness of the layer of adhesive may vary over a broad range of about 10 microns to several hundred microns (e.g., about 200 microns).

Once the adhesive composition as been coated, and optionally crosslinked, the adhesive surface of the article may, optionally, be protected with a temporary, removable release liner (i.e., protective liner) such as a polyolefin (e.g., polyethylene or polypropylene) or polyester (e.g., polyethylene terephthalate) film, or a plastic film. Such films may be treated with a release material such as silicones, waxes, fluorocarbons, and the like.

Backings and Articles

The wet-stick pressure-sensitive adhesives of the present invention that adhere to wet or moist skin and similar surfaces are useful in many medical applications. For example, these wet-stick adhesives are useful in medical applications such as tapes, bandages, dressings, and drapes to adhere to moist skin surfaces such as wounds or areas of the body prone to moistness.

The adhesive compositions can be included in a variety of dressing constructions known in the art. Typically, the composition is in the form of a continuous or discontinuous coating on at least one major surface of a backing. The backing may include one or more layers and be in a variety of forms (e.g., foams or films). Examples of suitable backings include materials with a relatively low content of hydrophilic components such as polyester (e.g., commercially available under the designation HYTREL™, such as HYTREL 4056, from DuPont Co.), polyurethane (e.g., commercially available under the designation ESTANE™, such as ESTANE 58309 and ESTANE 58237, from B. F. Goodrich Co.), polyether block amide (e.g., commercially available under the designation PEBAX™, such as PEBAX 2533 and 3533, from Atochem Co.), and porous polyethylene resins. Also suitable are materials having relatively high moisture vapor transmission properties. Examples include certain polyether amides such as PEBAX 4011RNOO (Atochem Co.), and polyurethanes as described in U.S. Pat. No. 4,598,004 (Heinecke). Both classes of materials may also be used in combination with each other (e.g., in sandwich-type arrangements) to tailor the moisture vapor transmission properties of the dressing. Examples of specific dressing configurations for which the compositions are suitable are described in U.S. Pat. No. 4,952,618 (Olsen).

EXAMPLES

This invention is further illustrated by the following examples that are not intended to limit the scope of the invention. In the examples, all parts, ratios and percentages are by weight unless otherwise indicated. The following test methods were used to evaluate and characterize the wet-stick adhesive compositions and corresponding adhesive dressings produced in the examples. All materials are commercially available, for example from Aldrich Chemicals (Milwaukee, Wis.), unless otherwise indicated or described.

TEST PROTOCOLS

Water Absorption

Evaluation of percent water absorption of an adhesive composition was measured using the following test procedure. The adhesive composition was coated onto a poly (ethylene terephthalate) (PET) film with a 0.05 mm dry thickness. The sample was dried in an oven at 65° C. for 30 minutes (min), covered with a release liner, and cut into two 7.6-cm×7.6-cm samples. One of the samples was weighed (without release liner) to obtain the Dry Adhesive Weight (total weight less weight of PET film). The other sample was soaked in water (without liner) for 24 hours (hr) at room temperature. The soaked sample was taken out of the water, covered with a liner to squeeze out the excess amount of water, and wiped with a dry tissue paper. The liner was removed and the sample weighed to obtain the Absorbed Water Weight (total weight of soaked sample less total weight of dry sample). The Percent Water Absorption was then calculated using the formula: Water Absorption (%)= Absorbed Water Weight×100÷Dry Adhesive Weight. Results reported are the average of 2 replications.

Adhesion to Dry and Wet Skin

Evaluation of the adhesiveness of a composition to human skin is an inherently temperamental determination. Human skin possesses wide variations in composition, topography, and the presence/absence of various body fluids. However, comparative average values of tape or dressing adhesion are attainable by using test results from several individuals as described herein.

Initial skin adhesion ($T_0$) to dry or wet skin and skin adhesion at 24 hours ($T_{24}$) or 48 hours ($T_{48}$) were measured in accordance with the widely accepted PSTC-1 Peel Adhesion Test (incorporated herein by reference), a testing protocol established by the Specifications and Technical Committee of the Pressure-Sensitive Tape Council located at 5700 Old Orchard Road, Skokic, Ill. The test was modified for the purposes of this invention by applying the dressing sample to the skin of a living human.

Three samples (one for $T_0$ wet-skin testing, one for $T_0$ dry-skin testing, and one for $T_{24}$ or $T_{48}$ dry skin testing), each measuring 2.5-cm wide by 7.6-cm long, were applied to the back of each of one to eight human subjects. The subjects were placed in a prone position with arms at their sides and heads turned to one side. Samples were applied without tension or pulling of skin to both sides of the spinal column with the length of each sample positioned at a right angle to the spinal column.

Those samples tested for wet skin adhesion were applied to skin which had been moistened with a water saturated cloth, leaving visually observable drops of standing water, immediately before application of the sample.

The samples were pressed into place with a 2-kg roller moved at a rate of approximately 2.5 cm/sec with a single forward and reverse pass. No manual pressure was applied to the roller during application.

The samples were then removed about 2–5 minutes after application ($T_0$) at a removal angle of 180° and at a removal rate of 15 centimeters per minute (cm/min) using a conventional adhesion tester equipped with a 11.3 kg test line attached to a 2.5 cm clip. The clip was attached to the edge of the sample furthest from the spinal column by manually lifting about 1 cm of the sample from the skin and attaching the clip to the raised edge. The adhesion tester was a strain-gauge mounted on a motor-driven carriage. The measured force required to effect removal of each dressing sample was reported (as an average of 6–16 sample replications) in Newtons per decimeter (N/dm). Preferably, to adhere to wet skin, the ($T_0$) wet value is greater than about 0.8 N/dm and it is desired that the ($T_0$) wet value is approximately the same as the ($T_0$) dry value.

Inherent Viscosity (IV) (Degree of Polymerization)

The inherent viscosity of a polymer is measured in accordance with the protocol described by Fred Bilmeyer, Jr. at pages 84–85 of the textbook entitled *Textbook of Polymer Science*, Second Edition, published by Wiley-Interscience (1971). Briefly, solution viscosity is measured by comparing the efflux time (t) required for a specified volume of polymer solution to flow through a capillary tube with the corresponding efflux time ($t_0$) for the solvent. The measured variables t, $t_0$, and solute concentration (c) are then used to calculate inherent viscosity (also know as Logarithmic Viscosity) using the equation:

$$\eta = (\ln t/t_0)/c$$

For the examples of the present invention, IV was determined as a 0.25 weight percent of the adhesive composition in tetrahydrofuran (THF).

General Procedures

Polymerization Process A

To a glass bottle were added an acrylate monomer (A parts), acrylic acid (B parts), a poly(alkylene oxide) copolymer (C parts), ethyl acetate(90–97 parts), isopropanol (3–10 parts), and VAZO-67 thermal initiator (2,2-azobis(2-methylbutanedinitrile), Dupont, Wilmington, Del.) (0.20 parts based on monomer plus poly(alkylene oxide) copolymer), wherein A+B+C was equal to 100 parts and the quantity of ethyl acetate+isopropanol was equal to 100 parts. The quantities of solvent were adjusted to achieve adhesive compositions of varying inherent viscosity (IV). The bottle was degassed with nitrogen at 1.0 liter per minutes (1/min) for 1.5 min, sealed, and then tumbled for 24 hr in a 60° C. water bath. The resulting polymeric adhesive solution was subsequently used to coat various tape and dressing backings for evaluation of adhesive properties.

Polymerization Process B

Packaged polymerized acrylate wet-stick adhesive compositions were prepared according to the method described in copending PCT Pat. Application No. PCT/US99/06063, filed on Mar. 19, 1999 entitled "Wet Surface Adhesives". Briefly, two sheets of a heat sealable ethylene vinyl acetate film having a thickness of 64 micrometers and a 6 mole % vinyl acetate content (VA24, commercially available from Consolidated Thermoplastics Co.; Schaumburg, Ill.) were heat sealed on the lateral edges and the bottom to form a rectangular pouch measuring approximately 5 cm wide. A polymerizable mixture comprising an acrylate monomer, acrylic acid, a poly(alkylene oxide) copolymer, initiator and chain transfer agent were prepared and delivered into the unsealed edge of the pouch. The unsealed edge of the filled pouch was then heat sealed to form 5 cm by 8.9-cm pouches containing the polymerizable mixture.

The pouch was placed in a water bath that was maintained at about 16° C. and exposed to ultraviolet radiation at an intensity of about 3.5 mW/cm$^2$ for 8.5 minutes (UV Exposure Time). The radiation was supplied from lamps having about 90% of the emissions between 300 and 400 manometers (nm), and a peak emission at 351 nm.

Polymerization Process C

Polymerized acrylate wet-stick compositions were prepared according to the method described in U.S. Pat. No. 5,753,768 (Ellis) and U.S. Pat. No. 5,637,646 (Ellis). The compositions were prepared by two successive adiabatic polymerizations. In the first reaction, the mixture was partially polymerized and cooled. Then more initiator and monomer was added and the polymerization was continued in a second adiabatic polymerization. Isopropyl alcohol was added at different levels to achieve adhesive compositions of varying inherent viscosity (IV). The general procedure is described as follows.

To a laboratory adiabatic reaction device (VSP2, Fauske and Associates, Burr Ridge, Ill.) were added an acrylate monomer (A parts), acrylic acid (B parts), a poly(alkylene oxide) copolymer (C parts), VAZO 52 (0.0025 parts based on monomer plus poly(alkylene oxide) copolymer, Dupont), and the thermal stabilizer Irganox™ 1010, which is pentaerythritol tetrakis(3-(3,5-di-tert-butyl-4-hydroxyphenyl) propionate), (0.25 parts based on monomer plus poly (alkylene oxide) copolymer, Ciba Geigy Corp.) The mixture was purged of oxygen by pressuring the reaction containment vessel with nitrogen and venting several times while mixing the reaction mixture with a magnetic stir bar. The containment vessel was pressured to 345 KPa with nitrogen for the reaction. The mixture was heated to approximately 60° C. and held until reaction began. Polymerization was performed adiabatically and the temperature typically peaked at about 140° C. The mixture was allowed to cool below about 50° C. and more monomers and initiators were added (VAZO™ 52 at 0.006 parts, VAZO™ 67 at 0.003 parts, VAZO™ 88 at 0.003 parts, and di t-amyl peroxide at 0.002 parts, all based on the weight of monomers plus poly(alkylene oxide) copolymer). The mixture was again purged of oxygen by pressuring the reaction containment vessel with nitrogen and venting several times. The containment vessel was pressured to 345 KPa with nitrogen for the second reaction. The mixture was heated to approximately 60° C. and held until reaction began. Polymerization was performed adiabatically and the temperature typically peaked at about 140° C.

Preparation of Adhesive Tapes and Dressings

An adhesive solution was coated onto silicone-coated release paper using a knife-over-bed coater with a knife gap suitable for the desired coating thickness of 0.025 mm for film dressing examples or 0.04–0.05 mm for tape examples. The coating was dried in an air-circulating oven at 105° C. for 10 min. The adhesive layer was then laminated to a film dressing or tape backing at room temperature using a standard laboratory laminator. If the dressings were to be sterilized, they were exposed to gamma radiation at a sterilizing dose of 25–50 kiloGray.

Examples 1–7 and Comparative Example 1

Adhesive Compositions

Adhesive compositions (Examples 1–7, Comparative Example 1) were prepared (Polymerization Process A) from 2-ethylhexyl acrylate (2-EHA) (60 parts), acrylic acid (AA) (20 parts), and various poly(alkylene oxide) copolymers (PAOC) (20 parts) as listed in Table 1. Table 1 includes adhesive compositions made from PLURONIC™ poly (alkylene oxide) copolymers (BASF, Mount Olive, N.J.), TETRONIC™ poly(alkylene oxide) copolymers (BASF, Mount Olive, N.J.), and, as Comparative Example 1, from poly(propylene oxide), MW=2000 (Aldrich Chemical Co., Milwaukee, Wis.). The adhesive compositions were evaluated for percent water absorption and inherent viscosities (IV) and test results are provided in Table 1.

Examples 8–14 and Comparative Examples 2–3

Adhesive Dressings

Adhesive dressings (Examples 8–14) were constructed by laminating the adhesive compositions listed in Table 1 (Examples 1–7, respectively) onto 0.025 mm polyurethane film (ESTANE™ 58237, B. F. Goodrich, Cleveland, Ohio) followed by exposure to gamma radiation. The sterile adhesive dressings were evaluated for initial ($T_0$) wet and dry skin adhesion and for dry skin adhesion at 48 hours after application ($T_{48}$). The ratio values of $T_0$ (Wet)/$T_0$ (Dry) were also calculated. Test results are provided in Table 1a and are compared with the results from testing an adhesive dressing made by substituting poly(propylene oxide) for the poly (alkylene oxide) copolymer (Comparative Example 2) and from testing the commercial adhesive dressing, TEGADERM™ HP (Comparative Example 3) (3M Company, St. Paul, Minn.). Results are the average of 16 replicates (8 test subjects, 2 replicates/subject) and a Standard Deviation (SD) is provided for each of the measured values. All of the adhesive dressings listed in Table 1a had $T_0$ (Wet) values of at least 1.4 N/dm, $T_0$ (Dry) values of at least 1.7 N/dm, and $T_0$ (Wet)/$T_0$ (Dry) ratios of at least 0.73. Table 1a also shows that an adhesive dressing coated with the hydrophobic poly(propylene oxide) (Comparative Example 2) exhibited a ratio of $T_0$ (Wet)/$T_0$ (Dry) that is substantially lower than the hydrophobic/hydrophilic poly(alkylene oxide) copolymers (Examples 8–14) of the invention. This demonstrates the importance of having a hydrophilic component in the poly (alkylene oxide) copolymer.

TABLE 1

Adhesive Compositions

| | Components (Parts by Weight) | | | Water Absorption | IV |
|---|---|---|---|---|---|
| Ex. | 2-EHA | AA | PAOC(20) | (%) | (dl/g) |
| 1 | 60 | 20 | PLURONIC ™ L64 | 7.6 | 0.54 |
| 2 | 60 | 20 | PLURONIC ™ P65 | 8.2 | 0.54 |
| 3 | 60 | 20 | TETRONIC ™ 90R4 | 45 | 0.52 |
| 4 | 60 | 20 | TETRONIC ™ 150R1 | 4.7 | 0.55 |
| 5 | 60 | 20 | TETRONIC ™ 904 | 31 | 0.56 |
| 6 | 60 | 20 | PLURONIC ™ L92 | 5.5 | 0.55 |
| 7 | 60 | 20 | PLURONIC ™ 25R4 | 4.6 | 0.53 |
| Comp. 1 | 60 | 20 | Poly(propylene oxide) | 0.3 | 0.53 |

TABLE 1a

Adhesive Dressings
(Adhesive Compositions Listed in Table 1 on a Film Backing)

| | Skin Adhesion (N/dm) | | | | | | |
|---|---|---|---|---|---|---|---|
| Ex. | $T_0$ (Wet) | SD | $T_0$ (Dry) | SD | $T_0$ (Wet)/$T_0$ (Dry) | $T_{48}$ (Dry) | SD |
| 8 | 2.0 | 0.7 | 2.1 | 0.6 | 0.92 | 7.6 | 2.5 |
| 9 | 2.6 | 1.3 | 2.8 | 0.6 | 0.94 | 8.0 | 3.6 |
| 10 | 2.4 | 0.7 | 2.4 | 0.6 | 0.99 | 14.5 | 8.0 |
| 11 | 1.4 | 0.2 | 1.7 | 0.4 | 0.85 | 5.7 | 1.5 |
| 12 | 1.6 | 0.7 | 2.1 | 0.8 | 0.78 | 6.0 | 1.3 |
| 13 | 2.0 | 0.6 | 2.7 | 0.7 | 0.73 | 9.5 | 2.8 |
| 14 | 2.6 | 0.9 | 3.3 | 1.2 | 0.77 | 10.5 | 4.0 |
| Comp. 2 | 1.9 | 0.9 | 3.2 | 1.0 | 0.58 | 10.6 | 5.7 |
| Comp. 3 | 1.1 | 0.5 | 1.9 | 0.7 | 0.55 | 3.2 | 0.9 |

Examples 15–28

Adhesive Compositions and Dressings

Adhesive compositions were prepared (Polymerization Process A) from isooctyl acrylate (IOA), acrylic acid (AA), and TETRONIC™ 90R4 (T 90R4) poly(alkylene oxide) copolymer at various ratios of components and with the inherent viscosities as listed in Table 2. Adhesive dressings (Examples 15–28) were constructed by laminating the adhesive compositions onto 0.025 mm polyurethane film (ESTANE™ 58237) followed by exposure to gamma radiation. The sterile adhesive dressings were evaluated for initial ($T_0$) wet and dry skin adhesion and for dry skin adhesion at 48 hours after application ($T_{48}$). The ratio values of $T_0$ (Wet)/$T_0$ (Dry) were also calculated. Test results are provided in Table 2. Results are the average of 6 replicates (6 test subjects, 1 replicate/subject) and a Standard Deviation (SD) is provided for each of the measured values. Examples with identical adhesive component percentages (e.g., Examples 15 and 25, Examples 16 and 27, and Examples 24 and 26) represent separately prepared and tested adhesive dressings. Most of the dressings listed in Table 2 had $T_0$ (Wet) values of at least 0.9 N/dm, $T_0$ (Dry) values of at least 0.8 N/dm, and $T_0$ (Wet)/$T_0$ (Dry) ratios of at least 0.62.

Examples 29–43

Adhesive Compositions and Dressings

Adhesive compositions were prepared (Polymerization Process A) from isooctyl acrylate (IOA), acrylic acid (AA), and TETRONIC™ 90R4 poly(alkylene oxide) copolymer at various ratios of components and with the inherent viscosities as listed in Table 3. Adhesive dressings (Examples 29–43) were constructed by laminating the adhesive compositions onto 0.025 mm polyurethane film (ESTANE™ 58237, B. F. Goodrich, Cleveland, Ohio) followed by exposure to gamma radiation. The sterile adhesive dressings were evaluated for initial ($T_0$) wet and dry skin adhesion and for dry skin adhesion at 48 hours after application ($T_{48}$). The ratio values of $T_0$ (Wet)/$T_0$ (Dry) were also calculated. Test results are provided in Table 3. Results are the average of 6 replicates (6 test subjects, 1 replicate/subject) and a Standard Deviation (SD) is provided for each of the measured values. Examples with identical adhesive component percentages (e.g., Examples 29 and 37, Examples 40 and 42, and Examples 39 and 43) represent separately prepared and tested adhesive dressings. All of the dressings listed in Table 3 had $T_0$ (Wet) values of at least 0.9 N/dm, $T_0$ (Dry) values

TABLE 2

Adhesive Compositions and Dressings (Film Backing)

| | Components (Parts by Wt.) | | | Skin Adhesion (N/dm) | | | | | $T_{48}$ | | IV |
|---|---|---|---|---|---|---|---|---|---|---|---|
| Ex. | IOA | AA | T90R4 | $T_0$ (Wet) | SD | $T_0$ (Dry) | SD | $T_0$ (Wet)/$T_0$ (Dry) | (Dry) | SD | (dl/g) |
| 15 | 75 | 13 | 12 | 1.1 | 0.3 | 1.9 | 0.6 | 0.56 | 8.7 | 2.5 | 0.70 |
| 16 | 60 | 17 | 23 | 1.5 | 0.4 | 1.7 | 0.7 | 0.90 | 8.4 | 3.8 | 0.59 |
| 17 | 68 | 17 | 15 | 1.2 | 0.2 | 1.1 | 0.3 | 1.04 | 6.2 | 2.1 | 0.59 |
| 18 | 65 | 14 | 21 | 1.6 | 0.5 | 2.9 | 1.3 | 0.56 | 11.2 | 3.2 | 0.64 |
| 19 | 69.5 | 13 | 17.5 | 1.7 | 0.4 | 2.7 | 1.4 | 0.62 | 10.8 | 4.0 | 0.64 |
| 20 | 70 | 18 | 12 | 0.7 | 0.3 | 0.8 | 0.2 | 0.79 | 5.0 | 0.9 | 0.67 |
| 21 | 65 | 18 | 17 | 1.0 | 0.3 | 1.0 | 0.3 | 1.03 | 5.0 | 2.6 | 0.59 |
| 22 | 72.5 | 15.5 | 12 | 1.05 | 0.4 | 1.4 | 0.4 | 0.77 | 6.8 | 2.6 | 0.64 |
| 23 | 63 | 17 | 20 | 1.1 | 0.2 | 1.2 | 0.4 | 0.89 | 7.2 | 1.9 | 0.60 |
| 24 | 64 | 13 | 23 | 4.3 | 2.8 | 9.2 | 6.8 | 0.46 | 14.4 | 2.0 | 0.58 |
| 25 | 75 | 13 | 12 | 1.5 | 0.6 | 1.9 | 0.6 | 0.79 | 11.0 | 4.6 | 0.60 |
| 26 | 64 | 13 | 23 | 1.7 | 0.4 | 5.7 | 3.9 | 0.30 | 11.7 | 3.5 | 0.58 |
| 27 | 60 | 17 | 23 | 0.9 | 0.3 | 1.35 | 0.5 | 0.66 | 8.0 | 5.7 | 0.59 |
| 28 | 70 | 18 | 12 | 0.75 | 0.3 | 0.8 | 0.1 | 0.88 | 4.4 | 1.3 | 0.63 | of at least 0.7 N/dm, and most of the dressings had $T_0$(Wet)/$T_0$(Dry) ratios of at least 0.64.

TABLE 3

Adhesive Compositions and Dressings (Film Backing)

| | Components (Parts by Wt.) | | | Skin Adhesion (N/dm) | | | | | | | |
|---|---|---|---|---|---|---|---|---|---|---|---|
| Ex. | IOA | AA | T90R4 | $T_0$ (Wet) | SD | $T_0$ (Dry) | SD | $T_0$ (Wet)/ $T_0$ (Dry) | $T_{48}$ (Dry) | SD | IV (dl/g) |
| 29 | 75 | 15 | 10 | 0.9 | 0.3 | 1.1 | 0.4 | 0.85 | 4.3 | 1.0 | 0.58 |
| 30 | 70 | 15 | 15 | 1.8 | 1.2 | 1.3 | 0.4 | 1.32 | 5.4 | 2.7 | 0.59 |
| 31 | 65 | 20 | 15 | 0.9 | 0.4 | 0.7 | 0.2 | 1.40 | 3.2 | 1.3 | 0.57 |
| 32 | 73.75 | 12.5 | 13.75 | 1.3 | 0.8 | 2.0 | 0.8 | 0.64 | 7.8 | 4.8 | 0.60 |
| 33 | 63.75 | 12.5 | 23.75 | 2.6 | 1.5 | 3.6 | 1.6 | 0.73 | 9.1 | 7.3 | 0.58 |
| 34 | 70 | 20 | 10 | 1.1 | 0.8 | 0.7 | 0.4 | 1.75 | 3.6 | 1.8 | 0.61 |
| 35 | 65 | 15 | 20 | 1.5 | 0.5 | 1.4 | 0.5 | 1.10 | 5.7 | 2.9 | 0.63 |
| 36 | 67.5 | 15 | 17.5 | 1.9 | 1.0 | 1.3 | 0.5 | 1.44 | 4.6 | 1.7 | 0.63 |
| 37 | 75 | 15 | 10 | 2.0 | 1.3 | 1.1 | 0.5 | 1.71 | 4.0 | 1.9 | 0.65 |
| 38 | 60 | 10 | 30 | 4.4 | 3.7 | 17.0 | 4.3 | 0.26 | 10.7 | 4.3 | 0.53 |
| 39 | 80 | 10 | 10 | 2.0 | 1.5 | 4.2 | 1.0 | 0.47 | 10.4 | 5.0 | 0.56 |
| 40 | 70 | 10 | 20 | 4.0 | 2.7 | 7.0 | 4.0 | 0.57 | 11.1 | 3.7 | 0.62 |
| 41 | 60 | 20 | 20 | 1.9 | 0.8 | 1.6 | 1.5 | 1.19 | 4.7 | 2.0 | 0.60 |
| 42 | 70 | 10 | 20 | 5.9 | 5.8 | 9.1 | 4.3 | 0.64 | 10.8 | 5.5 | 0.63 |
| 43 | 80 | 10 | 10 | 2.0 | 1.2 | 3.0 | 0.7 | 0.68 | 8.7 | 4.1 | 0.59 |

Examples 44–57

Adhesive Compositions and Dressings

Adhesive compositions were prepared (Polymerization Process A) from isooctyl acrylate (IOA), acrylic acid (AA), and TETRONIC™ 90R4 poly(alkylene oxide) copolymer at various ratios of components and with the inherent viscosities as listed in Table 4. (These adhesive compositions are the same as those listed in Table 2.) Adhesive dressings (Examples 44–57) were constructed by laminating the adhesive compositions listed onto woven cellulose acetate taffeta (backing used in DURAPORE™ Surgical tape, 3M Company, St. Paul, Minn.). The non-sterilized adhesive dressings were evaluated for initial ($T_0$) wet and dry skin adhesion and for dry skin adhesion at 24 hours after application ($T_{24}$). The ratio values of $T_0$ (Wet)/$T_0$ (Dry) were also calculated. Test results are provided in Table 4 and are compared with the results from testing the commercial adhesive dressing, DURAPORE™ Surgical Tape. Results are the average of 8 replicates (8 test subjects, 1 replicate/subject) and a Standard Deviation (SD) is provided for each of the measured values. Examples with identical adhesive component percentages (e.g., Examples 44 and 54, Examples 45 and 56, Examples 49 and 57, and Examples 53 and 55) represent separately prepared and tested adhesive dressings. All of the dressings listed in Table 4 had $T_0$ (Wet) values of at least 1.0 N/dm, $T_0$ (Dry) values of at least 2.2 N/dm.

TABLE 4

Adhesive Compositions and Dressings (Woven Cellulose Acetate Backing)

| | Components (Parts by Wt.) | | | Skin Adhesion (N/dm) | | | | | | | |
|---|---|---|---|---|---|---|---|---|---|---|---|
| Example | IOA | AA | T90R4 | $T_0$ (Wet) | SD | $T_0$ (Dry) | SD | $T_0$ (Wet)/ $T_0$ (Dry) | $T_{24}$ (Dry) | SD | IV (dl/g) |
| 44 | 75 | 13 | 12 | 1.8 | 0.9 | 3.7 | 1.7 | 0.49 | 16.3 | 5.8 | 0.70 |
| 45 | 60 | 17 | 23 | 1.85 | 0.9 | 3.2 | 1.8 | 0.58 | 20.5 | 5.3 | 0.59 |
| 46 | 68 | 17 | 15 | 1.6 | 0.5 | 2.9 | 1.3 | 0.55 | 10.8 | 6.5 | 0.59 |
| 47 | 65 | 14 | 21 | 2.2 | 1.0 | 9.1 | 9.6 | 0.24 | 21.5 | 5.2 | 0.64 |
| 48 | 69.5 | 13 | 17.5 | 2.3 | 0.9 | 8.3 | 9.9 | 0.28 | 15.7 | 7.2 | 0.64 |
| 49 | 70 | 18 | 12 | 1.0 | 0.3 | 2.4 | 1.5 | 0.44 | 8.0 | 4.0 | 0.67 |
| 50 | 65 | 18 | 17 | 1.8 | 1.0 | 2.8 | 1.3 | 0.64 | 11.3 | 5.6 | 0.59 |
| 51 | 72.5 | 15.5 | 12 | 1.4 | 0.5 | 2.7 | 0.8 | 0.51 | 12.4 | 6.2 | 0.64 |
| 52 | 63 | 17 | 20 | 1.3 | 0.4 | 3.4 | 1.1 | 0.38 | 15.1 | 8.5 | 0.60 |
| 53 | 64 | 13 | 23 | 3.0 | 0.9 | 15.2 | 6.2 | 0.20 | 20.1 | 1.9 | 0.58 |
| 54 | 75 | 13 | 12 | 2.6 | 1.4 | 3.9 | 1.0 | 0.68 | 20.6 | 4.7 | 0.60 |
| 55 | 64 | 13 | 23 | 3.4 | 1.3 | 17.2 | 9.3 | 0.20 | 21.3 | 1.3 | 0.58 |
| 56 | 60 | 17 | 23 | 2.3 | 1.2 | 15.8 | 8.3 | 0.14 | 20.4 | 6.2 | 0.59 |

TABLE 4-continued

Adhesive Compositions and Dressings (Woven Cellulose Acetate Backing)

| | Components (Parts by Wt.) | | | Skin Adhesion (N/dm) | | | | | | | |
|---|---|---|---|---|---|---|---|---|---|---|---|
| Example | IOA | AA | T 90R4 | $T_0$ (Wet) | SD | $T_0$ (Dry) | SD | $T_0$ (Wet)/ $T_0$ (Dry) | $T_{24}$ (Dry) | SD | IV (dl/g) |
| 57 | 70 | 18 | 12 | 1.5 | 0.3 | 2.2 | 0.7 | 0.68 | 8.4 | 4.5 | 0.63 |
| Comp. Ex. 4 (DURAPORE™ Tape) | Polyacrylate-based continuously coated PSA | | | 0.85 | 0.4 | 2.8 | 0.7 | 0.30 | 10.9 | 2.7 | |

Examples 58–68

Adhesive Compositions and Dressings

Adhesive compositions were prepared (Polymerization Process A) from 2-ethylhexyl acrylate (2-EHA), acrylic acid (AA), and TETRONIC™ 90R4 poly(alkylene oxide) copolymer at various ratios of components and with the inherent viscosities as listed in Table 5.

A carded nonwoven web was constructed from a fiber blend that consisted of 60% poly(ethylene terephthalate) (PET) staple fiber (0.95 denier×3.8 cm, L-70, Hoechst Celanese Corp., Spartanburg, S.C.), 20% rayon staple fiber (1.5 denier×4.0 cm, Merge 8649, Lenzing, Charlotte, N.C.), and 20% bicomponent PET thermal bonding fiber (2.0 denier×3.8 cm, T-254, Hoechst Celanese Corp., Spartanburg, S.C.). The resulting carded nonwoven web (fiber basis weight of about 30 g/m²) was conventionally calendered and interbonded by a chemical bonding agent to afford a nonwoven polyester/rayon backing.

Adhesive dressings (Examples 58–68) were constructed by laminating the adhesive compositions listed in Table 5 onto the nonwoven polyester/rayon backing. The non-sterilized adhesive dressings were evaluated for initial ($T_0$) wet and dry skin adhesion and for dry skin adhesion at 48 hours after application ($T_{48}$). The ratio values of $T_0$ (Wet)/$T_0$ (Dry) were also calculated. Test results are provided in Table 5 and are compared with the results from testing the commercial adhesive dressing, DURAPORE™ Surgical Tape. Results are the average of 8 replicates (8 test subjects, 1 replicate/subject) and a Standard Deviation (SD) is provided for each of the measured values. Examples 62 and 68 that have identical adhesive component percentages represent separately prepared and tested adhesive dressings. All of the dressings listed in Table 5 had $T_0$ (Wet) values of at least 1.5 N/dm, $T_0$ (Dry) values of at least 0.6 N/dm.

TABLE 5

Adhesive Compositions and Dressings (Nonwoven Polyester/Rayon Backing)

| | Components (Parts by Wt.) | | | Skin Adhesion (N/dm) | | | | | | | |
|---|---|---|---|---|---|---|---|---|---|---|---|
| Example | EHA | AA | T 90R4 | $T_0$ (Wet) | SD | $T_0$ (Dry) | SD | $T_0$ (Wet)/ $T_0$ (Dry) | $T_{48}$ (Dry) | SD | IV (dl/g) |
| 58 | 62 | 18 | 20 | 2.7 | 1.1 | 1.4 | 0.8 | 2.0 | 4.7 | 2.4 | 0.57 |
| 59 | 35 | 25 | 40 | 4.6 | 2.6 | 0.9 | 0.3 | 5.4 | 2.8 | 2.1 | 0.36 |
| 60 | 40 | 20 | 40 | 5.4 | 2.6 | 1.2 | 0.4 | 4.5 | 3.2 | 2.0 | 0.46 |
| 61 | 42 | 23 | 35 | 4.2 | 1.5 | 0.9 | 0.2 | 4.8 | 3.3 | 1.4 | 0.48 |
| 62 | 42 | 18 | 40 | 6.5 | 2.9 | 1.5 | 0.7 | 4.2 | 3.6 | 2.0 | 0.45 |
| 63 | 40 | 25 | 35 | 4.3 | 2.8 | 0.7 | 0.3 | 5.8 | 3.2 | 2.2 | 0.42 |
| 64 | 47.8 | 21.2 | 31 | 3.5 | 1.8 | 1.0 | 0.4 | 3.5 | 3.8 | 2.5 | 0.49 |
| 65 | 60 | 20 | 20 | 2.0 | 1.0 | 1.0 | 0.4 | 2.1 | 3.8 | 1.9 | 0.58 |
| 66 | 45 | 25 | 30 | 2.4 | 1.0 | 0.8 | 0.4 | 2.9 | 2.4 | 0.9 | 0.53 |
| 67 | 55 | 25 | 20 | 1.5 | 0.4 | 0.6 | 0.2 | 2.6 | 2.6 | 1.0 | 0.51 |
| 68 | 42 | 18 | 40 | 6.7 | 3.8 | 1.8 | 0.9 | 3.8 | 3.9 | 2.3 | 0.49 |

Examples 69–79

Adhesive Compositions and Dressings

Adhesive compositions were prepared (Polymerization Process A) from 2-ethylhexyl acrylate (2-EHA), acrylic acid (AA), and TETRONIC™ 90R4 poly(alkylene oxide) copolymer at various ratios of components and with the inherent viscosities as listed in Table 6. (These adhesive compositions are the same as those listed in Table 5.) Adhesive dressings (Examples 69–79) were constructed by laminating the adhesive compositions listed onto woven cellulose acetate taffeta (backing used in DURAPORE™ surgical tape, 3M Company, St. Paul, Minn.). The non-sterilized adhesive dressings were evaluated for initial ($T_0$) wet and dry skin adhesion and for dry skin adhesion at 48 hours after application ($T_{48}$). The ratio values of $T_0$ (Wet)/$T_0$ (Dry) were also calculated. Test results are provided in Table 6. Results are the average of 8 replicates (8 test subjects, 1 replicate/subject) and a Standard Deviation (SD) is provided for each of the measured values. Examples 73 and 79 that have identical adhesive component percentages represent separately prepared and tested adhesive dressings. All of the dressings listed in Table 6 had $T_0$ (Wet) values of at least 1.6 N/dm, $T_0$ (Dry) values (except for Example 78) of at least 1.5 N/dm.

TABLE 6

Adhesive Compositions and Dressings (Woven Cellulose Acetate Backing)

| | Components (Parts by Wt.) | | | Skin Adhesion (N/dm) | | | | | | | |
|---|---|---|---|---|---|---|---|---|---|---|---|
| Example | EHA | AA | T 90R4 | $T_0$ (Wet) | SD | $T_0$ (Dry) | SD | $T_0$ (Wet)/ $T_0$ (Dry) | $T_{48}$ (Dry) | SD | IV (dl/g) |
| 69 | 62 | 18 | 20 | 2.7 | 0.8 | 1.9 | 1.0 | 1.4 | 4.9 | 2.2 | 0.57 |
| 70 | 35 | 25 | 40 | 11.8 | 3.8 | 4.4 | 2.2 | 2.6 | 15.0 | 7.9 | 0.36 |
| 71 | 40 | 20 | 40 | 17.6 | 4.2 | 26.9 | 5.4 | 0.7 | 21.3 | 4.2 | 0.46 |
| 72 | 42 | 23 | 35 | 12.1 | 6.0 | 3.6 | 1.9 | 3.4 | 17.0 | 6.7 | 0.48 |
| 73 | 42 | 18 | 40 | 11.4 | 4.5 | 17.9 | 9.1 | 0.6 | 10.8 | 5.8 | 0.45 |
| 74 | 40 | 25 | 35 | 10.8 | 7.0 | 4.5 | 4.8 | 2.4 | 15.5 | 9.8 | 0.42 |
| 75 | 47.8 | 21.2 | 31 | 4.5 | 2.5 | 2.9 | 1.6 | 1.6 | 12.2 | 8.1 | 0.49 |
| 76 | 60 | 20 | 20 | 2.1 | 1.0 | 1.7 | 0.9 | 1.2 | 7.1 | 3.0 | 0.58 |
| 77 | 45 | 25 | 30 | 4.5 | 4.1 | 1.5 | 0.7 | 3.1 | 15.8 | 11.6 | 0.53 |
| 78 | 55 | 25 | 20 | 1.6 | 0.7 | 0.5 | 0.3 | 2.9 | 5.3 | 2.1 | 0.51 |
| 79 | 42 | 18 | 40 | 18.7 | 3.6 | 22.4 | 8.0 | 0.8 | 20.6 | 4.1 | 0.49 |

Examples 80–84 and Comparative Example 4

Adhesive Compositions and Dressings

Adhesive compositions were prepared (Polymerization Process C) from 2-EHA (60 parts by weight), AA (20 parts by weight), and PLURONIC™ 25R4 poly(alkylene oxide) copolymer (20 parts by weight) with various inherent viscosities as listed in Table 7b. Various amounts of isopropyl alcohol (IPA) were used to obtain the varying inherent viscosities. The amounts of IPA used are shown in Table 7a (parts values are based on the total amount of 2-EHA, AA, and PLURONIC™ 25R4). All IPA was added before the first polymerization reaction (Reaction 1). The proportions of monomers used in Reaction 1 are also shown in Table 7a. After cooling the mixture to at least 50° C., the next initiator mixture was added, and the balance of 2-EHA and AA monomers were added to bring the final composition to 60 parts 2-EHA, 20 parts AA, and 20 parts PLURONIC™ 25R4 with 0.25 parts IRGANOX™ 1010 (based on total monomers plus PLURONIC™ 25R4).

TABLE 7a

| Example | IPA (Parts) | 2-EHA (Parts) | AA (Parts) | PLURONIC 25R4 (Parts) |
|---|---|---|---|---|
| 80 | 10 | 57.10 | 19.67 | 22.48 |
| 81 | 10 | 57.10 | 19.67 | 22.48 |

TABLE 7a-continued

| Example | IPA (Parts) | 2-EHA (Parts) | AA (Parts) | PLURONIC 25R4 (Parts) |
|---|---|---|---|---|
| 82 | 10 | 58.92 | 20.20 | 20.20 |
| 83 | 5 | 57.10 | 19.67 | 22.48 |
| 84 | 5 | 57.10 | 19.67 | 22.48 |

Adhesive dressings (Examples 80–84) were constructed by laminating the adhesive compositions onto 0.025 mm polyurethane film (ESTANE™ 58237) followed by exposure to gamma radiation. The sterile adhesive dressings were evaluated for initial ($T_0$ wet and dry skin adhesion and for dry skin adhesion at 24 hours after application ($T_{24}$). The ratio values of $T_0$ (Wet)/$T_0$ (Dry) were also calculated. Test results are provided in Table 7b and are compared with the results from testing the commercial adhesive dressing, TEGADERM™ HP (Comparative Example 4) (3M Company, St. Paul, Minn.). Results are the average of 8 replicates (4 test subjects, 2 replicates/subject) and a Standard Deviation (SD) is provided for each of the measured values. All of the dressings listed in Table 7b had $T_0$ (Wet) values of at least 1.2 N/dm, $T_0$ (Dry) values of at least 1.8 N/dm.

TABLE 7b

Adhesive Dressings
Adhesive Compositions and Dressings (Film Backing)

| | | Skin Adhesion (N/dm) | | | | | | |
|---|---|---|---|---|---|---|---|---|
| Example | IV (dl/g) | $T_0$ (Wet) | SD | $T_0$ (Dry) | SD | $T_0$ (Wet)/ $T_0$ (Dry) | $T_{24}$ (Dry) | SD |
| 80 | 0.404 | 3.0 | 2.0 | 9.4 | 6.6 | 0.33 | 18.8 | 3.2 |
| 81 | 0.409 | 2.4 | 1.8 | 5.5 | 6.4 | 0.42 | 19.3 | 1.9 |
| 82 | 0.445 | 2.4 | 1.5 | 2.9 | 2.2 | 0.70 | 17.4 | 4.9 |
| 83 | 0.636 | 2.3 | 1.4 | 5.4 | 6.4 | 0.43 | 16.6 | 4.5 |
| 84 | 0.725 | 1.2 | 0.8 | 1.8 | 0.7 | 0.83 | 7.6 | 1.8 |
| Comp. Ex. 4 (TEGADERM ™ HP) | — | 0.6 | 0.4 | 1.3 | 0.7 | 0.48 | 3.7 | 1.8 |

Examples 85–90

Adhesive Compositions

Adhesive compositions suitable for absorbent wound dressings were prepared (Polymerization Process A) from isooctyl acrylate (IOA), acrylic acid (AA), and TETRONIC™ 90R4 poly(alkylene oxide) copolymer at various ratios of components as listed in Table 8. The adhesive compositions were evaluated for percent water absorption and test results are provided in Table 8.

TABLE 8

Adhesive Compositions

| | Components (Parts by Weight) | | | |
|---|---|---|---|---|
| Ex. | IOA | AA | TETRONIC ™ 90R4 | Water Absorption (%) |
| 85 | 60 | 20 | 20 | 45 |
| 86 | 50 | 25 | 25 | 71 |
| 87 | 45 | 25 | 30 | 78 |
| 88 | 40 | 25 | 35 | 126 |
| 89 | 35 | 25 | 40 | 147 |
| 90 | 25 | 25 | 50 | 200 |

Example 91

Adhesive Composition

An adhesive composition suitable for absorbent wound dressings was prepared (Polymerization Process B) from 2-EHA (57.75 g), acrylic acid (20 g), PLURONIC™ 25R4 poly(alkylene oxide) copolymer (20 g), IRGACURE 184 initiator (Ciba Geigy Corp.) (0.17 g in 1.53 g 2-EHA), and IOTG (isooctyl thioglycolate chain transfer agent) (0.08 g in 0.72 g 2-EHA). The resulting adhesive composition had a 60/20/20 ratio (parts by weight) of 2-EHA/AA/Pluronic 25R4.

Example 92

Adhesive Composition

An adhesive composition suitable for absorbent wound dressings was prepared (Polymerization Process A) from IOA (60 parts), AA (20 parts), UCON™ 75-H-90000 poly(alkylene oxide) copolymer (20 parts, Union Carbide, Danbury, Conn.), and VAZO-67 initiator (0.2%, 50% in ethyl acetate/isopropanol (18.6/1.4) solvent. (Adhesive composition IV=0.65 dl/g.) The resulting adhesive solution showed no phase separation.

Comparative Example 5

Adhesive Composition with Phase Separation

An adhesive composition was prepared (Polymerization Process A) from IOA (60 parts), AA (10 parts), TETRONIC™ 1307 poly(alkylene oxide) copolymer (30 parts, M.P.=54° C., BASF, Mount Olive, N.J.), and VAZO-67 initiator (0.2%, 50% in ethyl acetate/isopropanol (19.2/0.8) solvent. (Adhesive composition IV=0.58 dl/g.) The resulting adhesive solution showed some crystals after standing at room temperature overnight. The solution was coated onto a polyester (PET) film and crystals were observed on the coated film.

Comparative Example 6

Adhesive Composition with Phase Separation

An adhesive composition was prepared (Polymerization Process A) from IOA (60 parts), AA (10 parts), TETRONIC™ 908 poly(alkylene oxide) copolymer (30 parts, M.P.=58° C., BASF, Mount Olive, N.J.), and VAZO-67 initiator (0.2%, 50% in ethyl acetate solvent). (Adhesive composition IV=0.99 dl/g.) The resulting adhesive solution showed numerous crystals after standing at room temperature overnight.

Various modifications and alterations of this invention will become apparent to those skilled in the art without departing from the scope and principles of this invention, and it should be understood that this invention is not to be unduly limited to the illustrative embodiments set forth hereinabove. All publications and patent documents are incorporated herein by reference to the same extent as if each individual publication or patent document was specifically and individually indicated to be incorporated by reference.

What is claimed:

1. A wet-stick pressure-sensitive adhesive comprising:
   (a) at least one copolymerized monoethylenically unsaturated (meth)acrylic acid ester monomer, wherein the (meth)acrylic acid ester monomer when homopolymerized has a Tg of less than 10° C.;
   (b) at least one copolymerized hydrophilic acidic monomer; and
   (c) at least one nonreactive poly(alkylene oxide) copolymer comprising at least two copolymerized alkylene oxides, at least one of which is hydrophilic and at least one of which is hydrophobic;
   wherein the nonreactive poly(alkylene oxide) copolymer has an HLB value of about 5 to about 15; and
   wherein an adhesive article comprising a backing and the wet-stick pressure-sensitive adhesive adheres to wet skin.

2. The wet-stick pressure-sensitive adhesive of claim 1 wherein the adhesive article has an initial wet skin adhesion of at least 0.8 N/dm.

3. The wet-stick pressure-sensitive adhesive of claim 1 wherein the (meth)acrylic acid ester monomer has the following general formula:

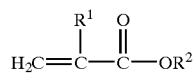

wherein $R^1$ is H or $CH_3$ and $R^2$ is a linear or branched hydrocarbon group of about 4 to about 14 carbon atoms optionally including one or more heteroatoms.

4. The wet-stick pressure-sensitive adhesive of claim 3 wherein the (meth)acrylic acid ester monomer is selected from the group consisting of n-butyl acrylate, 2-ethylhexyl acrylate, isooctyl acrylate, lauryl acrylate, and mixtures thereof.

5. The wet-stick pressure-sensitive adhesive of claim 1 wherein the (meth)acrylic acid ester monomer is present in a copolymerizable mixture of the monomers in an amount of about 30 wt-% to about 80 wt-%, based on the total weight of copolymerizable monomers.

6. The wet-stick pressure-sensitive adhesive of claim 1 wherein the hydrophilic acidic monomer is an ethylenically unsaturated carboxylic acid, an ethylenically unsaturated sulfonic acid, an ethylenically unsaturated phosphonic acid, or mixtures thereof.

7. The wet-stick pressure-sensitive adhesive according to claim 6 wherein the hydrophilic acidic monomer is an ethylenically unsaturated carboxylic acid.

8. The wet-stick pressure-sensitive adhesive of claim 1 wherein the hydrophilic acidic monomer is present in a copolymerizable mixture of the monomers in an amount of about 5 wt-% to about 35 wt-%, based on the total weight of copolymerizable monomers.

9. The wet-stick pressure-sensitive adhesive of claim 1 wherein the nonreactive poly(alkylene oxide) copolymer has a melting point of no greater than 50° C.

10. The wet-stick pressure-sensitive adhesive of claim 9 wherein the nonreactive poly(alkylene oxide) copolymer has a melting point of no greater than 25° C.

11. The wet-stick pressure-sensitive adhesive of claim 1 wherein the nonreactive poly(alkylene oxide) copolymer has a weight average molecular weight of about 1000 to about 15,000.

12. The wet-stick pressure-sensitive adhesive of claim 1 wherein the nonreactive poly(alkylene oxide) copolymer has an HLB value of about 5 to about 12.

13. The wet-stick pressure-sensitive adhesive of claim 1 wherein the nonreactive poly(alkylene oxide) copolymer derived from at least one hydrophilic alkylene oxide monomer and at least one hydrophobic alkylene oxide monomer is present in a ratio of about 90:10 to about 10:90.

14. The wet-stick pressure-sensitive adhesive of claim 1 wherein the nonreactive poly(alkylene oxide) copolymer comprises a least one hydrophilic monomer and at least one hydrophobic monomer in a ratio of about 80:20 to about 30:70.

15. The wet-stick pressure-sensitive adhesive of claim 1 wherein the nonreactive poly(alkylene oxide) copolymer is present in the pressure-sensitive adhesive in an amount of about 9 wt-% to about 30 wt-%, based on the total weight of the adhesive.

16. The wet-stick pressure-sensitive adhesive of claim 1 wherein the poly(alkylene oxide) copolymer comprises terminal groups selected from the group consisting of lower alkyl groups, amino groups, hydroxyl groups, carboxylic acid groups, aromatic groups, and mixtures thereof.

17. The wet-stick pressure-sensitive adhesive of claim 1 wherein the poly(alkylene oxide) copolymer comprises copolymerized monomers selected from the group consisting of ethylene oxide, propylene oxide, butylene oxide, trimethylene oxide, tetramethylene oxide, their corresponding glycols, and mixtures thereof.

18. The wet-stick pressure-sensitive adhesive of claim 1 which is crosslinked.

19. A method of making a wet-stick pressure-sensitive adhesive, the method comprising combining under conditions effective to cause polymerization:
(a) at least one monoethylenically unsaturated (meth) acrylic acid ester monomer, which when homopolymerized, has a Tg of less than 10° C.;
(b) at least one hydrophilic acidic monomer; and
(c) at least one nonreactive poly(alkylene oxide) copolymer comprising at least two copolymerized alkylene oxides, at least one of which is hydrophilic and at least one of which is hydrophobic;
wherein the nonreactive poly(alkylene oxide) copolymer has an HLB value of about 5 to about 15; and
wherein an adhesive article comprising a backing and the wet-stick pressure-sensitive adhesive adheres to wet skin.

20. The method of claim 19 wherein the monoethylenically unsaturated (meth)acrylic acid ester monomer and the hydrophilic acidic monomer are copolymerized prior to the addition of the nonreactive poly(alkylene oxide) copolymer.

21. The wet-stick pressure-sensitive adhesive of claim 1 wherein the adhesive article has an initial dry skin adhesion of at least 0.8 N/dm.

22. The wet-stick pressure-sensitive adhesive of claim 1 wherein the adhesive article has an initial wet skin adhesion that is at least 65% of the initial dry skin adhesion.

23. A wet-stick pressure-sensitive adhesive comprising:
(a) at least one copolymerized monoethylenically unsaturated (meth)acrylic acid ester monomer, wherein the (meth)acrylic acid ester monomer when homopolymerized has a Tg of less than 10° C.;
(b) at least one copolymerized hydrophilic acidic monomer, and
(c) at least one nonreactive poly(alkylene oxide) copolymer comprising at least two copolymerized alkylene oxides, at least one of which is hydrophilic and at least one of which is hydrophobic;
wherein the nonreactive poly(alkylene oxide) copolymer has an HLB value of about 5 to about 12; and
wherein the nonreactive poly(alkylene oxide) copolymer is present in the pressure-sensitive adhesive in an amount of about 9 wt-% to about 30 wt-%, based on the total weight of the adhesive.

24. The wet stick pressure-sensitive adhesive of claim 23 wherein the nonreactive poly(alkylene oxide) copolymer has a weight average molecular weight of about 1000 to about 15,000.

25. A wet-stick pressure-sensitive adhesive comprising:
(a) at least one copolymerized monoethylenically unsaturated (meth)acrylic acid ester monomer, wherein the (meth)acrylic acid ester monomer when homopolymerized has a Tg of less than 10° C.;
(b) at least one copolymerized hydrophilic acidic monomer; and
(c) at least one nonreactive poly(alkylene oxide) copolymer comprising at least two copolymerized alkylene oxides, at least one of which is hydrophilic and at least one of which is hydrophobic;
wherein the nonreactive poly(alkylene oxide) copolymer has an HLB value of about 5 to about 12;
wherein the nonreactive poly(alkylene oxide) copolymer is present in the pressure-sensitive adhesive in an amount of about 9 wt-% to about 30 wt-%, based on the total weight of the adhesive; and
wherein the nonreactive poly(alkylene oxide) copolymer has a weight average molecular weight of about 3000 to about 15,000.

* * * * *

UNITED STATES PATENT AND TRADEMARK OFFICE
CERTIFICATE OF CORRECTION

PATENT NO. : 6,903,151 B2  
APPLICATION NO. : 10/359761  
DATED : June 7, 2005  
INVENTOR(S) : Donald H. Lucast Page 1 of 1

It is certified that error appears in the above-identified patent and that said Letters Patent is hereby corrected as shown below:

Column 5
Line 49, delete "acrylarnide" and insert -- acrylamide --, therefore.

Column 8
Line 46, delete "ps Other Additives" and insert -- Other Additives --, (as heading), therefore.

Column 11
Line 54, delete "Skokic" and insert -- Skokie --, therefore.

Column 25
Line 24, after "comprises" delete "a" and insert -- at --, therefore.

Column 26
Line 21, after "monomer" delete "," and insert -- ; --, therefore.
Line 32, delete "wet stick" and insert -- wet-stick --, therefore.

Signed and Sealed this

Thirty-first Day of July, 2007

JON W. DUDAS
*Director of the United States Patent and Trademark Office*